UNITED STATES PATENT OFFICE.

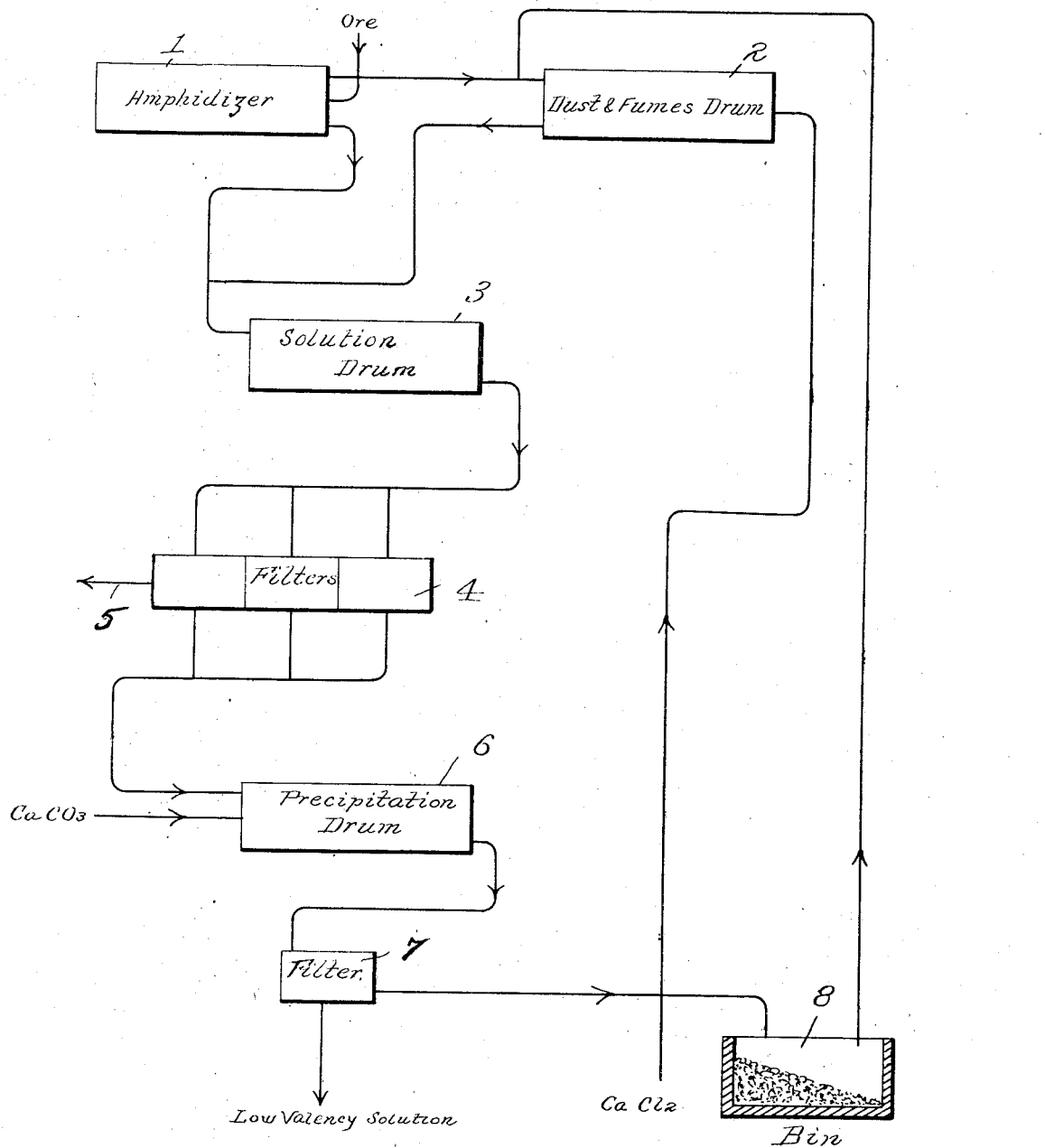

CHARLES S. BRADLEY, OF NEW YORK, N. Y.

CHEMICAL CONCENTRATION OF ORE VALUES.

1,204,932.      Specification of Letters Patent.      Patented Nov. 14, 1916.

Application filed March 10, 1913. Serial No. 753,287.

*To all whom it may concern:*

Be it known that I, CHARLES S. BRADLEY, a citizen of the United States, residing in the city, county, and State of New York, have invented certain new and useful Improvements in Chemical Concentration of Ore Values, of which the following is a full and clear specification.

The present invention relates to the concentration or recovery of ore values by wet chemical methods.

The invention comprises an improved method of conducting the operations of chemical concentration, apart from the specific materials or chemical reactions employed; and the invention further comprises a number of improved chemical treatments which are of especial importance in the concentration of ore values.

According to my present invention, I conduct the operations in such manner that the necessity for chemical analysis is largely avoided and excesses of the reagents employed may be maintained without loss, whereby complete extraction is obtained, the operations proceed with a minimum of attention, and the supply of acid radical and oxygen may be readily and positively adjusted.

Where metals of variable valency are to be recovered, the presence of high valency compounds is highly advantageous to the extraction as they aid in the dissolving of the values and tend toward complete extraction. On the other hand, the separation of the values from the solution, and their ultimate recovery in highly concentrated form may be more economically effected from the low valency compounds, as these are already partially reduced. These considerations lead me to proceed with a view to the recovery of the values from the low valency compounds, and to throw back to the extraction apparatus the high valency compounds to aid oxidation. The presence of acid radical is necessary to the dissolving of ore values, and sulfurous and sulfuric are the ones usually available. Hydrochloric acid radical can be made available through the provision of a chlorid carrier solution such as calcium chlorid, the action of the sulfuric acid upon this being to produce hydrochloric acid and insoluble calcium sulfate. In order to prevent the escape of acid fumes into the atmosphere, and to render a portion of the high valency compounds available for the dissolving of values, I conduct the throw back operation so as to subject the excess acid fumes to the high valency compounds, as I have found that the high valency compounds absorb acid fumes with great avidity.

The "throw back", or arrest and return of part of the values to a preceding step or position in the system, is one of the important features of my invention, not only for the reasons already apparent, but also in the partation or selective recovery of the ore values. Not only do the high valency compounds provide solvents, but they reject from solution those substances having less avidity for the acid radical employed. This rejection of the values of less avidity for the acid radical may be utilized as a means of their recovery or it may serve to eliminate undesired metals not worth recovering, whose presence in the solution would reduce the capacity of the solution for dissolving those values sought to be recovered. Where metals of variable valency are concerned this principle of operation may be intimately connected with the variations of the properties of the salts or compounds of the metal at different valencies and advantage can be taken of these conditions. The two oxids of copper, in connection with calcium chlorid dissolving and carrier solution, will serve as an example. There is a wide difference between the avidity of the two oxids of copper for hydrochloric acid in the presence of an excess solution of many chlorids, such as calcium chlorid and sodium chlorid. Indeed so great is this difference in the case of the two copper oxids that zinc oxid or calcium carbonate will precipitate cupric compounds from chlorid solutions whereas cuprous chlorid would not be affected. On the other hand, cuprous oxid precipitates zinc compounds from chlorid of zinc solutions. Cupric compounds have greater avidity for chlorid solutions than iron and aluminum, and hence the latter are precipitated by the former. Calcium oxid for example will precipitate iron, aluminum, copper and zinc oxids from chlorid solutions. It is thus apparent that in the case of a mixed ore containing for example iron, aluminum, copper and zinc for which chlorid solutions are employed, the "throw back" principle could, if desired, be carried out by precipitating the cuprous oxid by calcium oxid, which regenerates the calcium chlorid solution, then precipitating zinc oxid by throwing back cuprous oxid, then precipitating cupric compounds by throwing back zinc oxid and last of all precipitating iron and aluminum by throwing back cupric compounds. In this way, the solutions could first be freed from iron and aluminum by utilizing the cupric compounds, next be freed of cupric compounds by throwing back the zinc and be freed of zinc by throwing back cuprous oxid and finally freed of cuprous compounds by introducing calcium oxid. While the present invention is not to be understood as necessarily utilizing the throw back principle to this extent, the above example will, nevertheless, illustrate clearly the principle involved and is to be understood as coming within the broad scope of the invention.

To illustrate clearly the facility of commercial operation under the principles of my present invention I may refer to an embodiment of the invention in the chemical concentration of copper values from mixed ores containing iron and aluminum which it is desired to eliminate. It is to be understood, however, that the principles of the invention could be applied to the recovery of iron, aluminum or any of the other metals if desired, and the invention is not to be understood as being limited to the particular embodiment to which I refer for illustration.

In my prior Patent No. 1,011,562, granted December 12, 1911, I have shown and described a method in which the ore is first amphidized to render the values soluble, mainly as sulfates, the amphidized ore is then subjected to the action of a calcium chlorid dissolving and carrier solution maintained in excess of that required to dissolve the values, whereby the sulfates are converted into chlorids and the sulfate radical combined with calcium to form insoluble calcium sulfate, the solution containing the ore values in the form of chlorids is next freed of the gangue material and the precipitated waste products by filtration, and the values ultimately recovered from the dissolving and carrier solution of calcium chlorid by means of calcium carbonate, for example, which regenerates the calcium chlorid solution for re-use in the system. I shall assume that it was desired in a system of that general nature to keep the iron and aluminum out of the solution from which the copper is to be recovered, and that there is an excess of free acid to be absorbed. In describing the method employed, reference is made to the accompanying drawing.

The drawing shows diagrammatically a system for obtaining the values in solution. The finely divided ore or other substance bearing values, hereinafter referred to as ore, is subjected to the amphidizing operation in the amphidizer 1, from which the volatile products comprising the dust and fumes pass into the dust and fumes absorbing drum 2. The absorption of the dust and fumes will be better understood after description of the other features of the method upon which it depends, and hence will be referred to more in detail hereinafter. The amphidized ore from the amphidizer 1 and the products from the dust and fumes drum 2 are introduced into the solution drum 3 where the sulfates are converted into chlorids by the action of a calcium chlorid dissolving and carrier solution which is maintained in considerable excess of that required for dissolving the values. As a result of this action the values will be in the form of cupric and cuprous chlorids, iron and aluminum chlorids, and zinc chlorid, disregarding for the present the rejection of the iron and aluminum which will be explained later in more detail. The entire mass of solutions and gangue material is then delivered to the filters 4, by which the solutions containing the values are separated from the gangue material. The gangue material is discharged from the system as indicated by the arrow 5, and the clear solutions comprising the calcium chlorid carrier and cuprous chlorid, cupric chlorid, iron and aluminum chlorids, and zinc chlorid, are introduced into the high valency precipitation drum 6, to which is delivered a precipitating agent such as for example calcium carbonate, whereby the high valency copper compounds are precipitated. Iron and aluminum chlorids cannot remain in solution in the presence of insoluble copper, as the latter would replace the former as fast as formed, and consequently the precipitation of all the cupric copper insures the complete rejection of all the iron and aluminum from the solution. The cuprous copper and the zinc chlorid, on the other hand are not acted upon by the calcium carbonate, and consequently the calcium carbonate may be introduced in excess without the necessity of prior analysis of the solutions for quantitative determinations.

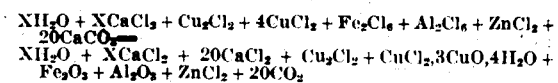

The solutions and precipitate are then discharged upon the filter 7, which separates the clear solutions of calcium chlorid containing the dissolved cuprous chlorid and zinc chlorid from the precipitated high valency copper compounds and iron and aluminum. Any excess calcium carbonate will be mixed in with the high valency precipitates. In the example of the high valency precipitation herein given, the calcium carbonate regenerates the calcium chlorid solution, thus avoiding loss of chlorin and providing for the formation of an insoluble sulfate from the sulfuric radical after the latter has completed its function of making the values amenable to the dissolving action of the calcium chlorid solution in the extraction operation. It is to be understood, however, that the regeneration of the carrier solution at this or any other particular place in the concentrating method is not a necessary consideration to the operation of the particular improvement which the present invention contemplates, and therefore the high valency precipitation may be performed with any other suitable reagent without departing from the spirit and principles of my present invention, and the regeneration of the carrier solution may be accomplished if desired at some other point in the system. The separation of the low valency compounds from the high valency compounds, so that the recovery may be made from the former and the extraction aided by the latter, is however a feature of the present embodiment of the invention, and therefore the invention contemplates the use of a reagent which will selectively precipitate, for example, the high valency copper while leaving the low valency copper in solution, at this point in the method.

Returning again to a consideration of the low valency solution and the high valency precipitates, the solutions are treated in any suitable manner to effect the recovery of their values, preferably in some way as by calcium oxid that leaves the carrier solution in suitable form for return to the extraction operation. I have, therefore, indicated the return of calcium chlorid solution to the extraction apparatus, as, for example, by introducing it into the dust and fumes drum 2. Any silver present in the ore will have been taken into the extraction solutions as silver chlorid, and as this substance is highly soluble in the cuprous chlorid and calcium chlorid solution, it will tend to go with the cuprous chlorid rather than precipitate with the high valency compounds. Therefore the silver may be recovered from the solutions after the high valency compounds have been separated from the solutions and before the low valency copper and the zinc have been recovered. The high valency precipitates are in accordance with the present example of the invention delivered into a bin 8 or other suitable receiver, from which they are returned to the extraction apparatus and where they may increase or decrease in quantity according to the rate of supply from the precipitating step referred to and the rate at which they are thrown back into the extraction apparatus, which will now be described.

The high valency compounds can be recognized or distinguished from each other by their respective colors. Under the conditions of operation given in the foregoing description, the copper compound precipitated is in the form of trioxychlorid of copper, its production from cupric chlorid being as represented in the equation:

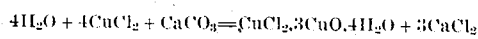

This precipitate when pure has a clear green color. The iron precipitate has a reddish or brownish color. When the copper precipitate has iron mixed with it, the clear green of the trioxychlorid is discolored by the reddish or brownish color, varying in degree with the proportion of iron present. The color of the precipitate may be taken as an indication of the amount of iron which is being taken into solution in the extraction step. The presence of dissolved iron insures the complete extraction of the copper, as iron can not remain in the solution in the presence of undissolved copper. Therefore it is not desirable to prevent entirely the presence of iron, for fear that some of the copper may be left unextracted from the ore, and one of the important features of my invention is the maintenance of an indeterminate quantity of a substance, such as iron, of less avidity than the values for the acid radical employed, so as to insure complete extraction. Excess acid, over and above that required for dissolving the copper and zinc, will tend to bring iron and aluminum into solution, and therefore the discoloration of the precipitate likewise indicates the excess of acid beyond that required for dissolving the copper and zinc. By throwing back the precipitated high valency compounds, free acid may be absorbed and iron and aluminum rejected from the solution. The ready adjustment of the quantity of the precipitate which it is desirable to throw back, can therefore be obtained without predetermination of the quantities involved but entirely from the observation of the color of the precipitate, thus avoiding the necessity of chemical analysis. Preferably the quantity is so adjusted as to keep the precipitate slightly tinged with the iron color, as the complete extraction of the copper is thereby insured. The particular method of conducting the ore concentrating method according to the present example of my invention, that is to say, the separation of the low valency compounds for the recovery of values, and the arrest and return or throwing back of the high valency compounds, enables the maintenance of iron in the extraction solutions to serve as a margin of safety to prevent loss of copper, to avoid chemical analysis, and to facilitate the regulation of oxidation which is accomplished by the return of the high valency compounds to the extraction operation.

The action of the high valency precipitate in absorbing the free acid may be indicated as follows:

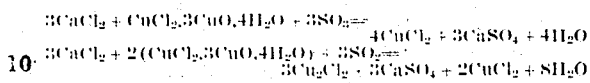

It will be observed from these equations, that the action of the high valency precipitate upon the free acid produces further quantities of lower valency compounds for the subsequent recovery operations.

When the supply of high valency precipitates is insufficient for the complete absorption of the excess free acid, the supply of calcium carbonate or the like may be increased, which will serve to further absorb the free acid, as the excess calcium carbonate is carried with the high valency precipitate to the acid absorption apparatus, where it will produce further quantities of trioxichlorid to supplement the amount thrown back. The color of the high valency precipitate will in this case be a guide to the ready adjustment of the supply of calcium carbonate to the high valency precipitation.

When the supply of acid is insufficient, the quantity of the high valency precipitate in the bin will increase. The sulfur content of the ore may then be increased, as this will have the effect of producing more acid. If the quantity of precipitate returned is adjusted so as to keep the precipitate a uniform color, the quantity of precipitate in the bin will be an indication of the proper sulfur content of the ore, as if the sulfur content is high, the precipitate will decrease, and if low will increase.

It is obvious that free acid fumes may, if desired, be removed from the system without subjecting them to absorption, for use in any other desired operation, and also that where the quantity of trioxychlorid runs in excess of that required in the system, part of it may be removed and treated for recovery.

What I claim is:

1. The method of concentrating ore values, which comprises obtaining values in solution as variable valency compounds in the ous and ic condition, precipitating and returning to the extraction apparatus high valency compounds, and recovering the values in the form of low valency compounds.

2. The method of concentrating ore values, which comprises obtaining values in solution as variable valency compounds in the ous and ic condition, selectively precipitating high valency compounds and returning them to the operation of obtaining values in solution, and recovering from the remaining solution the low valency compounds.

3. The method of concentrating ore values, which comprises subjecting the ore to an extraction operation for dissolving the soluble constituents, selectively precipitating and returning to the extraction operation a part of the dissolved constituents, and subjecting the remaining solution to a recovery operation for the recovery of values contained therein.

4. The method of concentrating ore values, which comprises dissolving substances of different avidity for the acid radical employed, continuously precipitating and throwing back to the extraction apparatus part of the substance for rejecting from solution substance of less avidity for the acid radical, and recovering substance of greater avidity from the remaining solution.

5. The method of concentrating ore values, which comprises dissolving values, continuously precipitating and throwing back to the extraction apparatus part of the values to reject from solution substances of less avidity for the acid radical employed, and recovering values from the remaining solution.

6. The method of concentrating ore values, which comprises dissolving values, continuously precipitating and throwing back in cyclic manner part of the values to dissolve further values, and recovering values from the remaining solution.

7. The method of concentrating ore values, which comprises dissolving values, continuously precipitating and throwing back in cyclic manner to the extraction apparatus part of the values to absorb excess free acid, and recovering values from the remaining solution.

8. The method of concentrating ore values, which comprises taking into solution the values, together with a substance of less avidity for the acid radical employed, precipitating and throwing back to the extraction apparatus the substance of less avidity, and recovering values from the remaining solution thus freed of the substance of less avidity.

9. The method of concentrating ore values, which comprises taking into solution the values, together with a substance of less avidity for the acid radical employed, removing gangue material from the solutions, precipitating the substance of less avidity and throwing it back in cyclic manner to a point in the system preceding the removal of gangue material, and recovering values from the remaining solution thus freed of the substance of less avidity.

10. The method of concentrating ore values, which comprises taking into solution the values, together with a substance of less avidity for the acid radical employed, removing gangue material from the solutions, precipitating and throwing back to the extraction apparatus part of the desired values, together with the substances of less avidity, and recovering values from the remaining solution thus freed of the substance of less avidity.

11. The method of concentrating ore values, which comprises taking into solution the values comprising variable valency compounds in the ous and ic condition, together with a substance of less avidity for the acid radical employed, precipitating and throwing back to the extraction apparatus the high valency values together with the substance of less avidity, and recovering values from the remaining solution thus freed of the substance of less avidity.

12. The method of conducting the operations of chemical concentration of ore values, which comprises subjecting the ore containing variable valency salts in the ous and ic condition and other compounds of metals to the action of a dissolving and carrier solution, removing the gangue material from the resulting solution of variable valency salts, precipitating high valency compounds and throwing them back in cyclic manner to a point in the system preceding the removal of gangue material, and recovering values from the remaining solution.

13. The method of conducting the operations of chemical concentration of ore values, which comprises subjecting the ore containing variable valency salts in the ous and ic condition and other compounds of metals to the action of a dissolving and carrier solution, removing gangue material from the resulting solution of variable valency salts, precipitating and removing from solution high valency compounds of the values together with a substance of less avidity for the acid radical employed, throwing back to the system more or less of the precipitate according to the proportion of the substance of less avidity present in the precipitate, and recovering values from the remaining solution.

14. The method of conducting the operations of chemical concentration of ore values, which comprises subjecting the ore to an extraction operation whereby is obtained a solution of values and a substance of less avidity for the acid radical employed, precipitating part of the values together with the substance of less avidity, and returning to the extraction operation more or less of the precipitate as the quantity of substance of less avidity in the solution coming from the extraction operation increases or decreases.

15. The method of conducting the operations of chemical concentration of ore values, which comprises subjecting the ore to an extraction operation whereby is obtained a solution of values and a substance of less avidity for the acid radical employed and whose precipitate is capable of discoloring that of the values, precipitating part of the values together with the substance of less avidity and returning to the extraction operation more or less of the precipitate according to the color of the precipitate.

16. The method of conducting the operations of chemical concentration of ore values, which comprises subjecting the ore containing an acid radical developed therein, to an extraction operation whereby is obtained a solution of values and a substance of less avidity for the acid radical, precipitating part of the values together with the substance of less avidity, utilizing the precipitate for absorbing excess free acid, and reducing the supply of acid radical as the available supply of the precipitate diminishes.

17. The method of conducting the operations of chemical concentration of ore values, which comprises taking values into solution as variable valency compounds, precipitating high valency compounds and returning them in cyclic manner to oxidize the substances subjected to the dissolving operation, adjusting the return of the high valency compounds to regulate the oxidation, and recovering values from the remaining solution.

18. The method of conducting the operations of chemical concentration of ore values, which comprises taking into solution variable valency values together with a substance of less avidity for the acid radical employed, precipitating high valency values together with the substance of less avidity, utilizing the precipitate to oxidize the substances subjected to the dissolving operation, and adjusting the quantity of the precipitate thus employed according to the quantity of the substance of less avidity therein, to regulate the oxidation.

19. The method of conducting the operations of chemical concentration of ore values, which comprises taking into solution variable valency values together with a substance of less avidity for the acid radical employed and whose precipitate is capable of discoloring that of the high valency values, precipitating high valency values and the substance of less avidity, utilizing the precipitate to oxidize the substances subjected to the dissolving operation, and adjusting the quantity of the precipitate thus employed according to the discoloration, to regulate the oxidation.

20. The method of concentrating copper values, which comprises subjecting the ore containing copper, iron and aluminum to a dissolving and carrier solution, removing gangue material, precipitating high valency copper values together with the iron and aluminum contents, throwing back the precipitate, and recovering copper values from the remaining low valency solution.

21. The method of concentrating copper values, which comprises subjecting the ore containing copper, iron and aluminum to a dissolving and carrier solution, removing gangue material, precipitating high valency copper values, with the iron and aluminum contents, throwing back the precipitate to reject iron and aluminum from solution in the dissolving operation, adjusting the quantity of the precipitate thrown back according to the color of the precipitate to regulate the quantity of iron and aluminum carried in the solution coming from the dissolving operation, and recovering copper values from the remaining low valency solution.

22. The method of concentrating copper values, which comprises subjecting the ore containing copper, iron and aluminum to an extraction operation, removing gangue material, precipitating high valency copper values together with the iron and aluminum contents, utilizing the high valency precipitate for oxidation in the extraction operation, adjusting the quantity of high valency precipitate thus employed according to the iron color in the precipitate, to regulate the oxidation, and recovering values from the low valency solution.

23. The method of concentrating copper values, which comprises subjecting the ore containing copper, iron and aluminum to an extraction operation, removing gangue material, precipitating high valency copper values together with the iron and aluminum contents, utilizing the precipitate to reject iron and aluminum in the extraction operation, adjusting the quantity of high valency precipitate thus employed according to the iron color in the precipitate to leave an indeterminate quantity of iron and aluminum in the solution coming from the extraction operation so as to insure complete extraction of the copper without predetermination of the quantities involved, and recovering copper values from the remaining low valency solution.

24. The method of concentrating copper values, which comprises subjecting the ore containing copper, iron and aluminum, with an acid radical developed therefrom, to an extraction operation, removing gangue material, precipitating high valency copper values together with the iron and aluminum contents, utilizing the precipitate for absorbing excess acid radical, adjusting the quantity of precipitate thus employed according to the iron color of the precipitate to regulate the quantity of free acid radical, and recovering copper values from the remaining low valency solution.

25. The method of concentrating ore values, which comprises amphidizing the ore, subjecting the amphidized ore to the action of a dissolving and carrier solution, precipitating high valency values and utilizing the precipitate for absorbing excess acid fumes from the amphidizing treatment and for oxidizing the substances subjected to the action of the dissolving and carrier solution, and recovering low valency values from the remaining solution.

26. The method of concentrating ore values, which comprises amphidizing the ore, subjecting the amphidized ore to the action of a dissolving and carrier solution, precipitating high valency values and subjecting them to the action of excess acid fumes from the amphidizing treatment and to the action of the amphidized substance, whereby the excess acid fumes are absorbed, the amphidized substances further oxidized and the high valency precipitate reduced and redissolved, and recovering values from the remaining solution of low valency compounds.

27. The method of concentrating ore values, which comprises amphidizing the ore, dissolving from the amphidized ore the values together with a substance of less avidity for the acid radical employed, precipitating part of the values together with the substance of less avidity and utilizing the precipitate to absorb excess acid fumes from the amphidizing treatment, adjusting the quantity of the precipitate thus employed according to the quantity of the substance of less avidity in the precipitate to regulate the absorption of acid fumes, and recovering values from the remaining solution.

28. The method of concentrating copper and zinc values, which comprises obtaining from the ore a solution of variable valency copper values and the zinc values, precipitating high valency copper values and throwing them back to the extraction apparatus to reject substances of less avidity for the acid radical employed, recovering the zinc values from the remaining values from the solution and then recovering the low valency copper values from the solution thus depleted of zinc.

29. The method of concentrating copper, zinc and silver values, which comprises obtaining from the ore a solution of variable valency copper values, the zinc values and the silver values, precipitating high valency copper values, recovering the silver values from the remaining solution, then recovering the zinc values from the solution thus depleted of silver, and then recovering the low valency copper values from the solution thus depleted of zinc.

30. The method of concentrating copper, zinc and silver values, which comprises obtaining from the ore a solution of variable valency copper values, the zinc values and the silver values, precipitating high valency copper values and throwing them back to the extraction apparatus to reject from solution substances of less avidity for the acid radical employed, recovering the silver values from the remaining solution, then recovering the zinc values from the solution thus depleted of silver, and then recovering the low valency copper values from the solution thus depleted of zinc.

CHARLES S. BRADLEY.

Witnesses:
WM. A. COURTLAND,
OCTAVIUS KNIGHT.